United States Patent

[11] 3,573,781

| [72] | Inventor | Andrew Shoh<br>Ridgefield, Conn. |
|---|---|---|
| [21] | Appl. No. | 713,014 |
| [22] | Filed | Mar. 14, 1968 |
| [45] | Patented | Apr. 6, 1971 |
| [73] | Assignee | Branson Instruments, Incorporated<br>Stamford, Conn. |

[54] MONITORING CIRCUIT FOR SONIC APPARATUS
15 Claims, 3 Drawing Figs.

[52] U.S. Cl. .................................................. 340/248,
228/1, 310/8.1
[51] Int. Cl. ...................................................... G08b 21/00
[50] Field of Search ........................................... 340/248,
253; 219/(Inquired); 228/1, 565, (Inquired); 74/1
(SS); 73/67.1, 67.5, 69; 310/8.7, 8.1

[56] References Cited
UNITED STATES PATENTS

| 3,121,353 | 2/1964 | Scarpa et al. | 328/1 |
| 3,268,823 | 8/1966 | MacMillan | 340/248AUX |
| 3,351,927 | 11/1967 | Stinson | 340/248A |
| 3,432,691 | 3/1969 | Shoh | 310/8.1 |
| 3,447,051 | 5/1969 | Attwood et al. | 310/8.1X |

*Primary Examiner*—Donald J. Yusko
*Assistant Examiner*—Daniel Myer
*Attorney*—Ervin B. Steinberg ABSTRACT: A sonic or ultrasonic apparatus, actuated for a predetermined time interval, is provided with a control circuit for producing a signal if the energy delivered during such interval is either of too low a value or exceeds a permissible high value. Both the low limit and the high limit are adjustable.

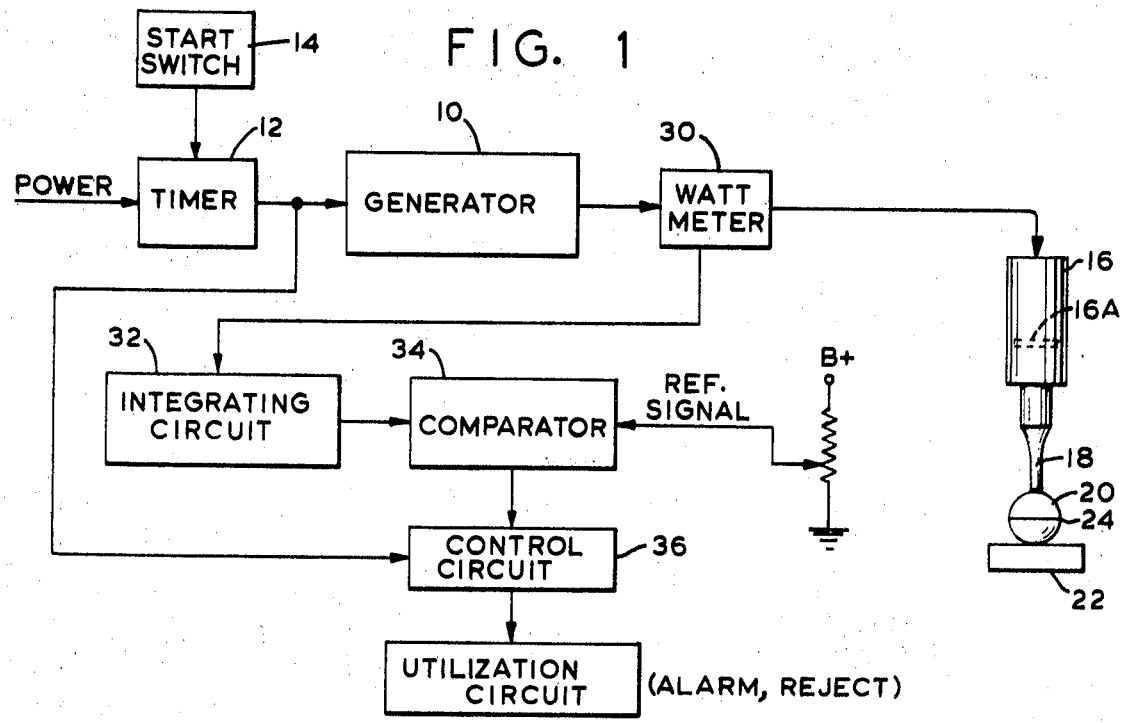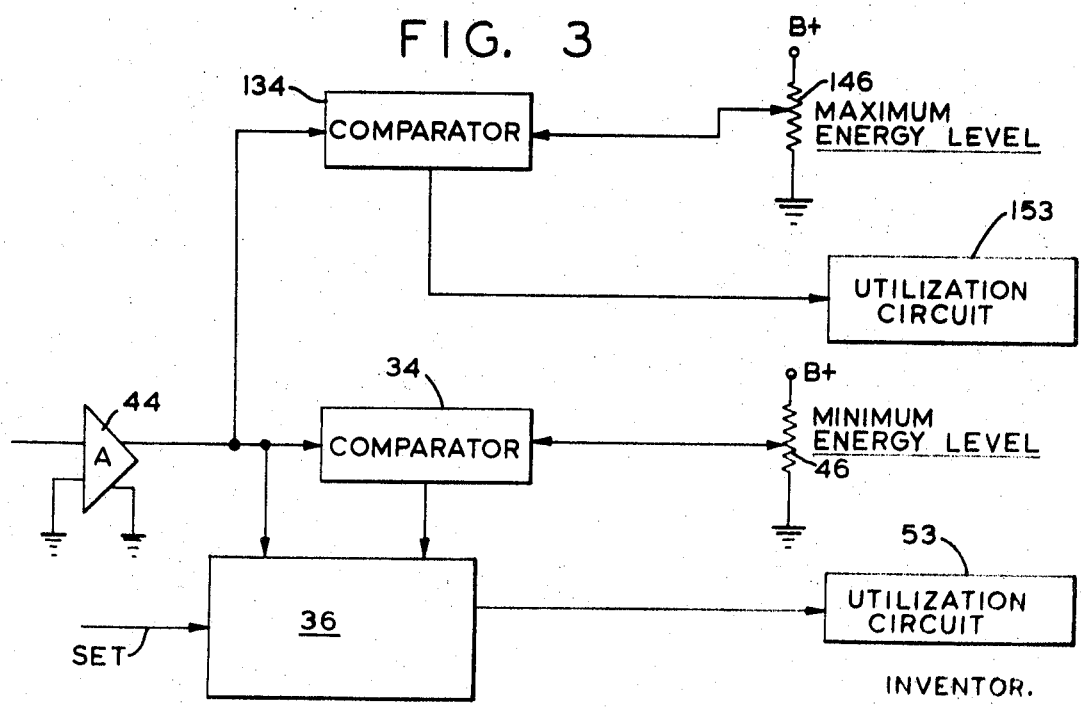

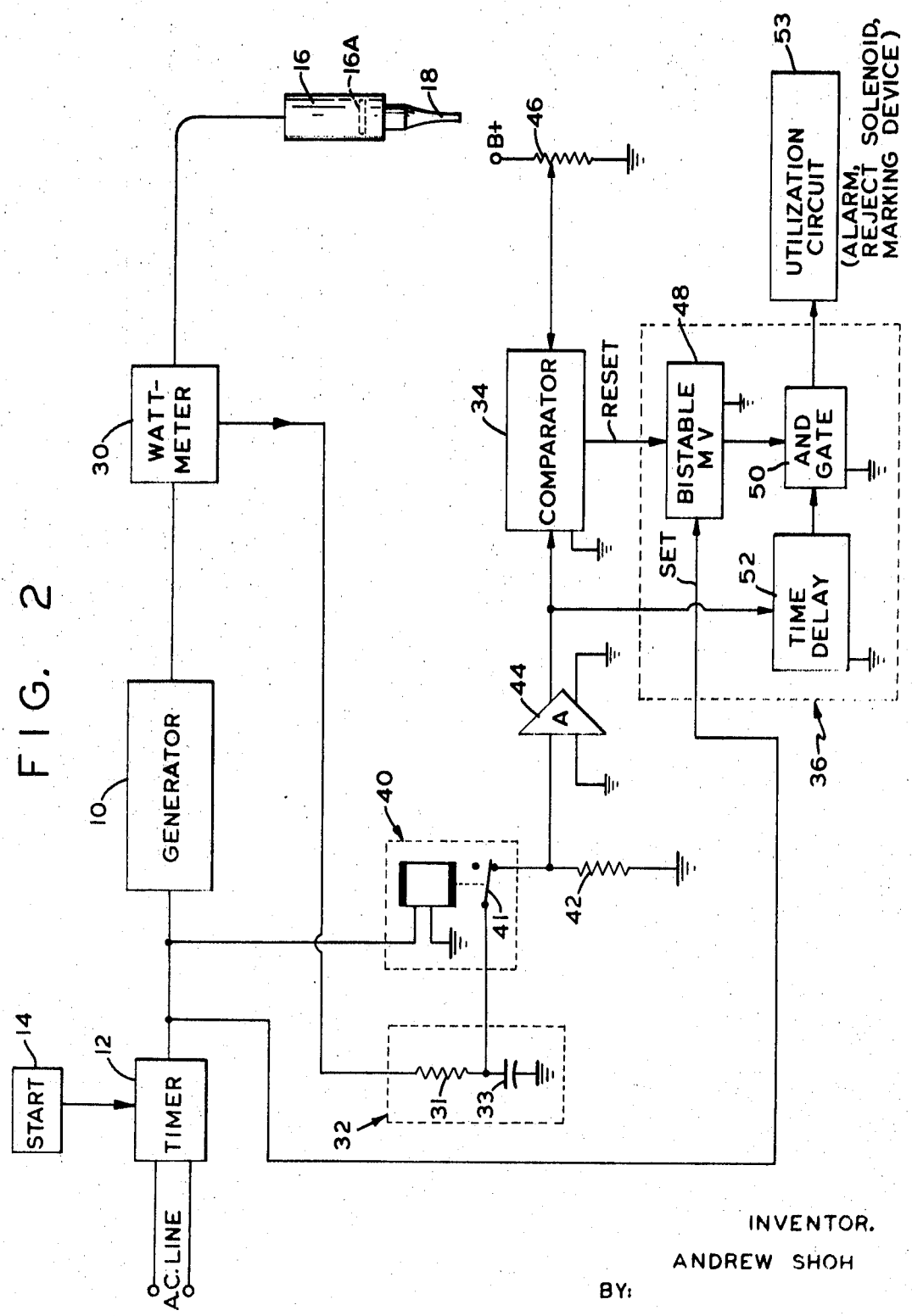

MONITORING CIRCUIT FOR SONIC APPARATUS

This invention relates to an apparatus for monitoring the amount of sonic energy provided during a predetermined time interval and, more specifically, has reference to a sonic or ultrasonic apparatus, such as an ultrasonic welding apparatus, provided with means for monitoring the amount of sonic energy delivered during each cycle of operation. Quite specifically, the invention is directed to means for operating control device, such as a signalling device, if the amount of sonic energy delivered during a particular work cycle fails to reach a predetermined value.

While the instant invention will be described in conjunction with a sonic welding apparatus, such as an apparatus used for providing a weld between two thermoplastic parts, it will be apparent that the same principle may be applied also to other and similar sonic energy devices, particularly those wherein an electroacoustic transducer is used for delivering energy to a workpiece.

The basic sonic or ultrasonic welding apparatus comprises principally an electrical high frequency generator and a sonic energy converter coupled to the generator for receiving electrical high frequency input and providing acoustic energy output. The converter includes electroacoustic transducing means, for instance magnetostrictive or piezoelectric material, and a resonating mass which is set into motion responsive to the electrical excitation applied to the transducing means. A resonating horn frequently is coupled to the transducing means for amplifying the vibrations produced. For performing work, the frontal surface of the horn is coupled to a workpiece, typically an assembly of thermoplastic parts which are to be welded together as is shown, for instance, in U.S. Pat. No. 3,224,916, R. S. Soloff et al., entitled "Sonic Method of Welding Thermoplastic Parts," dated Dec. 21, 1965.

In order to control the weld cycle, that is the time interval during which acoustic energy is provided from the sonic energy source to the workpiece, a timer adapted to switch power ON or OFF is inserted in the electrical circuit. The timer may be of the mechanical or of the electronic type. Most conveniently, the timer is disposed in the circuit between the line terminals and the high frequency generator in order to switch the electrical power at the low frequency level.

It has been found that inconsistencies may occur in the welding of parts, particularly when the weld cycles are of short duration, for instance a fraction of a second. The occurrence of such inconsistencies becomes apparent when the mechanics of the sonic welding arrangement described above is analyzed more closely. The output horn is standing still when the timing device first energizes the generator and must go from zero oscillating velocity to some steady state value in response to electrical energy from the generator. Additionally, loading of the horn and its consequent power buildup is affected by variations in the workpiece, such as shape, tolerances, placement on work table, material uniformity, etc. Oscillograms taken confirm that the shape of the buildup curve, i.e. power versus time, from the condition of standstill to resonance is rather inconsistent. The actual useful sonic work delivered is a value represented by the area underneath such curve and when short duty cycles are used this area can vary greatly. The power is the product of the velocity of the tip of the horn and the force opposing such motion represented by the part or material in contact with the tip of the horn. Neither the velocity buildup, nor force buildup versus time can be expected to be entirely consistent. The present invention is directed to an arrangement wherein a predetermined time cycle is used during which sonic energy is transferred to the workpiece, however, a monitoring circuit is provided to produce a signal or an alarm if the amount of energy transferred during such time cycle does not attain a predetermined value.

To this end, the invention disclosed hereafter includes circuit means for obtaining a signal proportional to the power from the electrical generator to the sonic energy converter, means for integrating this signal with respect to time, and means for comparing the value of the time integrated signal with a predetermined second signal. A control circuit is actuated if the integrated signal representing sonic energy delivered by the converter to the workpiece does not attain the desired value.

One of the principal objects of this invention is, therefore, the provision of a new and improved apparatus for monitoring the transfer of acoustic energy.

Another important object of this invention is the provision of a novel monitoring circuit for a sonic energy transfer apparatus, the circuit being adapted to provide a signal if the amount of energy transferred during a predetermined time interval does not attain a predetermined value.

Another object of this invention is the provision of a monitoring circuit for an ultrasonic apparatus wherein the monitoring circuit provides a signal if the amount of sonic energy transferred to a workpiece during a predetermined time interval time does not attain a preset value.

A further important object of this invention is the provision of a circuit adapted to be used in conjunction with a cyclically operated ultrasonic welding apparatus for monitoring the condition that a preset amount of ultrasonic energy is transferred during each cycle from a source of sonic energy to a workpiece, and providing an alarm if such predetermined amount is not attained within a preset time interval.

Further and still other objects of this invention will be more clearly apparent by reference to the following description, when taken in conjunction with the accompanying drawings, in which:

FIG. 1 is a schematic block diagram of a typical embodiment of the present invention, FIG. 2 is a schematic circuit diagram showing in greater detail the components of the embodiment per FIG. 1, and FIG. 3 is a schematic circuit diagram showing a modification of the circuit per FIG. 2.

Referring now to the FIGS. and FIG. 1 in particular, an electrical high frequency generator 10 receives power from the power line via timer 12 which is started in response to the operation of a start switch 14. Typically, the timer is a mechanical or an electronic unit having means for varying the time period during which the generator 10 is actuated. The time interval during which the generator 10 is actuated, in typical embodiments, may vary from a fraction of a second to a fraction of a minute. The generator receives 60 Hz line voltage and delivers high frequency power, typically 20 kHz. to a converter unit 16 which is provided with one or more piezoelectric transducer discs 16A for converting the electrical energy applied thereto to mechanical vibrations. As is well-known, the mechanical vibrations produced by the transducer discs 16A can be amplified by mechanical impedance transformer means, such as the horn 18 which is mechanically coupled to the transducer discs 16A. As disclosed in the patent identified hereinabove, the sonic energy (vibrations) appearing at the frontal end of the horn 18 can be coupled to a thermoplastic workpiece 20 supported on a platform 22. The ultrasonic vibrations produce a weld along the interface 24 which separates both halves of the workpiece 20. The timer 12, generator 10, and converter 16 are commercial units and are available, for instance, from the Branson Sonic Power Company, Miry Brook Road, Danbury, Conn., as Model J17V or Model J32. The converter unit 16 is described also in greater detail in U.S. Pat. No. 3,328,610, entitled "Sonic Wave Generator," S. E. Jacke et al., dated Jun. 27, 1967.

As indicated hereinabove, in the normal course of operation, the timer 12 is preset to a predetermined time cycle. When welding workpieces 20 on a production line basis, it may occur occasionally that the horn 18 is not in good contact with a workpiece, that the buildup of sonic power takes a greater amount of time than that which is normally experienced, or that other occurrences take place which prevent the proper transfer of sonic energy during the time the generator 10 is energized. The insufficient transfer of energy during such time cycle, of course, may reflect itself as a defective weld or as a weld of less than acceptable quality. In such cases it is desirable that either an alarm be given so that a particular workpiece 20 can be removed and inspected, or that a control device be actuated to cause the workpiece to be transferred to a reject bin.

In order to accomplish the monitoring of the transfer of energy, an ultrasonic frequency wattmeter 30 is connected in series with the generator 10 and the converter unit 16 to sense the flow of power and provide an output signal which is responsive to the power flowing to the converter unit 16. An integrating circuit 32 is connected to receive the power responsive signal and integrate such signal with respect to time, the signal thus becoming responsive to the amount of energy transferred to the converter unit 16. A comparator circuit 34 compares the amplitude of the integrated signal with respect to a reference signal, and is connected to a further control circuit 36 which provides a signal to a utilization circuit adapted to operate an alarm, a reject solenoid, or similar device in the event that during the predetermined time interval the value of the integrated signal does not reach the level of the preset reference signal. The operation of the control circuit 36 is synchronized with the operation of the timer and, therefore, is operated cyclically.

Referring now to FIG. 2, showing the typical embodiment in greater detail, it should be noted that the same numerals have been used to identify the parts discussed in connection with the description of FIG. 1. The wattmeter 30 is a commercial unit, Model WAJ2, available from Branson Sonic Power Company supra. The meter provides an output voltage which is proportional to the power delivered by the generator 10 to the converter 16. This signal corresponding to the power is applied to a conventional electrical integrating circuit 32 which comprises the series connection of a resistor 31 and a capacitor 33. An electromagnetic relay 40 having a normally closed contact 41 is provided to sample the voltage across the capacitor 33 at the end of the time cycle. The coil of the relay 40 is connected to the output side of the timer 12 and while the timer 12 does not energize the generator 10, there exists a short time constant discharge path for the capacitor 33, this path being established via the closed contact 41 and the resistor 42 connected to ground potential. When the timer 12 is operated, responsive to the actuation of the start switch 14, and the generator 10 is receiving electrical energy, the coil of the relay 40 is energized, thereby lifting the contact 41 and permitting the capacitor 33 to be charged from the signal supplied by the wattmeter 30 via the resistor 31. When the timer 12 terminates the time period during which the generator 10 delivers electrical power to the converter 16, the relay coil becomes deenergized and contact 41 assumes the lower position, thereby transferring a signal whose amplitude corresponds to the voltage across the capacitor 33 to the amplifier 44 which is a conventional AC amplifier. The amplifier 44 provides an output signal to the voltage comparator 34 which receives also a steady reference signal from the variable voltage source 46.

A bistable multivibrator 48 is connected to receive a first input ("SET") signal from the output side of the timer 12 and a second input ("RESET") signal from the output side of the comparator circuit 34. The reset signal is supplied only if during the predetermined period of time the amplitude of the pulse signal from the amplifier 44 exceeds the level set by the reference signal from the source 46. An AND gate 50 receives as its input the output signal from the multivibrator 48 and a signal from the time delay circuit 52, a monostable multivibrator, coupled to the output signal from the amplifier 44.

The bistable multivibrator 48 is in the "SET" condition and the gate 50 is in the open position at the start of the time cycle. Responsive to the termination of the time cycle, the amplifier 44, as noted hereinabove, provides a pulse signal caused by the operation of the switch 41, such pulse signal being applied to the time delay circuit 52 and subsequently as an input signal to the gate 50. If the multivibrator 48 remains in the "SET" condition when the signal from the amplifier 44 via the delay circuit 52 reaches the gate 50, denoting no output signal from the comparator 34, the gate 50 provides an output signal to a utilization circuit 53 comprising for instance an alarm, a counter, a reject solenoid, a marking device spraying paint on the article, a shutdown circuit, etc., signifying that the workpiece did not receive sufficient energy during the preceding work cycle. However, if the bistable multivibrator 48 has received a reset signal from the comparator 34, denoting the condition that the energy delivered exceeded the level set by the source 46, the gate 50 is closed and when the input signal from the time delay circuit 52 is applied to the gate 50, no output signal to the utilization circuit is produced. The time delay circuit 52 is provided in order to permit a brief period of delay during which the comparator circuit 34 and the multivibrator 48 can operate in order to permit the gate to assume the closed condition if the comparator circuit provides an output signal.

It should be noted that the control circuit 36 is operated during each operating cycle, and that the utilization circuit 53 is conditioned to be actuated responsive to the receipt of a signal from the time delay 52, the effect of such signal being blocked, however, by the gate 50 in the event that the multivibrator at the end of the operating interval receives a reset signal responsive to the output from the comparator 34.

FIG. 3 shows a modification of the circuit, providing for the generation of a signal if the energy delivered exceeds a preset level, thus indicating the condition when an excessive amount of energy is delivered to the workpiece during the predetermined time period. This occurrence may cause burning or charring of a workpiece and it may be desirable to segregate such workpieces for inspection. To this end, a second comparator circuit 134 is coupled to receive the output pulse from the amplifier 44. A maximum energy level signal is provided by the source 146 to the comparator circuit 134. The comparator circuit 134 provides an output signal if the pulse signal from the amplifier 44 exceeds the adjusted DC level signal from the source 146. If such an output signal occurs, denoting sonic energy in excess of the adjusted level, the utilization circuit 153 is triggered to provide an alarm or provide a function of the kind described above in connection with the circuit 53. It will be seen, therefore, that the combination of circuits per FIGS. 2 and 3 is adapted to provide an indication when the sonic energy delivered during a predetermined time period falls outside of preset limits. In this way, the described arrangement is suited to monitor the quality of articles produced.

It may be observed that the signal from the integrating circuit 32 is transformed to a pulse signal and then processed as such a signal. While a comparison of direct current signal amplitudes could be used, this method would require the use of DC amplifiers which are subject to drift and, therefore, is characterized by inherent disadvantages.

The above described circuit is merely illustrative of a typical monitoring circuit and it will readily be apparent to those skilled in the art that similar and other circuits can be designed for performing the same functions without deviating from the broad inventive concept disclosed.

I claim:
1. In a sonic apparatus the combination of:
   a source of high frequency electrical energy adapted to be coupled to a sonic power source for providing sonic power to a workpiece in response to electrical energy applied to said sonic power source;
   timing means coupled for actuating said source for a predetermined time interval during which said sonic power source delivers such power;
   means coupled for sensing the amount of power transferred to said sonic power source during said time interval and providing a signal responsive to said power;
   means coupled for integrating said power responsive signal with respect to time and for comparing said signal when integrated with a reference signal; and
   further means coupled to assume a first condition if said integrated signal is of a smaller value than said reference signal and to assume a second condition if said integrated signal exceeds the value of said reference signal.

2. In a sonic apparatus as set forth in claim 1 and including means for energizing a utilization circuit responsive to said further means being in said first condition at the termination of said predetermined time interval.

3. In a sonic apparatus as set forth in claim 1 and including means coupled to said integrating means for providing at the end of said predetermined interval a pulse signal whose amplitude is commensurate with the sonic energy delivered to the workpiece and said reference signal being an adjustable direct current signal; said further means being responsive to the amplitude difference of said signals.

4. In an ultrasonic apparatus the combination of:
a source of high frequency electrical energy adapted to be coupled to an ultrasonic power source for providing sonic power to a workpiece;
timing means coupled for actuating said ultrasonic power source for a predetermined time interval during which said ultrasonic source delivers power to a workpiece;
sensing means coupled for sensing the amount of power transferred by said ultrasonic power source to the workpiece during said time interval and providing a signal responsive to the magnitude of said power;
electrical integrating means including a capacitor coupled for receiving said signal from said sensing means whereby said capacitor is charged during said interval to a peak value commensurate with the signal from said sensing means;
means actuated at the termination of said interval for providing a pulse signal whose amplitude is responsive to the peak value of the charge of said capacitor;
comparison means coupled for receiving a reference signal and said pulse signal and for providing an output signal in response to the peak amplitude of said pulse signal exceeding the amplitude of said reference signal;
a control circuit coupled for processing said output signal; and
a utilization circuit coupled to said control circuit for providing a signal responsive to the absence of said output signal, whereby to denote that the ultrasonic energy delivered during said time interval failed to meet the desired level as adjusted by said reference signal.

5. In an ultrasonic apparatus as set forth in claim 4, said control circuit including a bistable multivibrator which is adapted to be set to a first state at the beginning of said time interval and adapted to be set to a second state responsive to the receipt of an output signal from said comparison means at the termination of said time interval; a gate circuit coupled to receive an output signal from said multivibrator and receive a time delayed signal at the termination of said time interval, and said gate circuit causing operation of said utilization circuit responsive to said bistable multivibrator being in said first state at the termination of said interval.

6. In an ultrasonic apparatus as set forth in claim 5, said utilization circuit adapted to provide a visual signal.

7. In an ultrasonic apparatus as set forth in claim 5, said utilization circuit adapted to provide an audible signal.

8. In an ultrasonic apparatus as set forth in claim 5, said utilization circuit adapted to operate a control device.

9. In a sonic apparatus the combination of:
a source of high frequency electrical energy adapted to be coupled to a sonic power source for providing sonic power to a workpiece in response to electrical energy applied to said sonic power source;
timing means coupled for actuating said source for a predetermined time interval during which said sonic power source delivers such power;
means coupled for sensing the amount of power transferred to said sonic power source during said time interval and providing a signal responsive to said power;
means coupled for integrating said power responsive signal with respect to time and for comparing said signal when integrated with a first and a higher amplitude second reference signal, and
utilization means coupled to provide a signal if said integrated signal is of a smaller value than said first reference signal and to provide a signal also if said integrated signal exceeds the value of said second reference signal.

10. In a sonic apparatus the combination of:
a source of sonic power adapted to be coupled to a workpiece for transferring sonic energy to the workpiece during a predetermined time interval;
timing means coupled to said source for establishing said time interval;
means coupled to said source for sensing the amount of energy transferred during said time interval, and
means coupled to said means for sensing for providing a signal if the amount of sonic energy transferred during said interval falls outside of a preset limit.

11. In a sonic apparatus as set forth in claim 10 said source providing energy in the ultrasonic frequency range.

12. In a sonic apparatus the combination of:
a source of sonic power adapted to be coupled to a workpiece for transferring sonic energy to the workpiece during a predetermined time interval;
timing means coupled to said source for establishing said time interval;
means coupled to said source for sensing the amount of energy transferred during said time interval, and
control means coupled to said means for sensing for providing a signal if the amount of sonic energy transferred during said interval fails to attain a predetermined level.

13. In a sonic apparatus as set forth in claim 12 said source providing energy in the ultrasonic frequency range.

14. In a sonic apparatus the combination of:
a source of sonic power adapted to be coupled to a workpiece for transferring sonic energy to the workpiece during a predetermined time interval;
timing means coupled to said source for establishing said time interval;
means coupled to said source for sensing the amount of energy transferred during said time interval, and
control means coupled to said means for sensing for providing a signal if the amount of sonic energy transferred during said interval exceeds a predetermined level.

15. In a sonic apparatus as set forth in claim 14, said source providing energy in the ultrasonic frequency range.